(12) United States Patent
Hausmann et al.

(10) Patent No.: US 12,258,138 B2
(45) Date of Patent: Mar. 25, 2025

(54) AIRCRAFT THROTTLE QUADRANT ASSEMBLY WITH INTEGRATED VISUAL INDICATOR FEATURE

(71) Applicant: Gulfstream Aerospace Corporation, Savannah, GA (US)

(72) Inventors: Jeffrey Hausmann, Savannah, GA (US); Gary Freeman, Savannah, GA (US); Michael Knight, Savannah, GA (US); Ozan Ates, Savannah, GA (US); Kristin Medin, Savannah, GA (US); Jim Jordan, Savannah, GA (US); Scott Bohanan, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 394 days.

(21) Appl. No.: 17/806,027

(22) Filed: Jun. 8, 2022

(65) Prior Publication Data

US 2023/0399117 A1  Dec. 14, 2023

(51) Int. Cl.
| | | |
|---|---|---|
| *B64D 31/04* | (2006.01) | |
| *B64D 31/14* | (2006.01) | |
| *B64D 45/00* | (2006.01) | |
| *G05G 1/015* | (2008.04) | |
| *G05G 1/02* | (2006.01) | |

(52) U.S. Cl.
CPC ............. *B64D 31/04* (2013.01); *B64D 31/14* (2013.01); *B64D 45/00* (2013.01); *G01D 2207/10* (2021.05); *G05G 1/015* (2013.01); *G05G 1/025* (2013.01)

(58) Field of Classification Search
CPC .................................................... B64D 45/00
See application file for complete search history.

(56) References Cited

U.S. PATENT DOCUMENTS

| | | | |
|---|---|---|---|
| 3,675,880 | A | 7/1972 | Koch |
| 3,848,833 | A | 11/1974 | Rauschelback |
| 4,538,777 | A | 9/1985 | Hall |
| 7,350,750 | B2 | 4/2008 | Jean-Philippe et al. |

(Continued)

FOREIGN PATENT DOCUMENTS

| | | |
|---|---|---|
| EP | 1400426 A2 | 3/2004 |
| EP | 2816435 A2 | 12/2014 |

(Continued)

*Primary Examiner* — Travis R Hunnings
(74) *Attorney, Agent, or Firm* — Lorenz & Kopf, LLP (57) ABSTRACT

A throttle quadrant system for an aircraft includes: a first throttle handle to control a first engine of the aircraft, the first throttle handle having a first activatable visual indicator integrated therein; a second throttle handle to control a second engine of the aircraft, the second throttle handle comprising a second activatable visual indicator integrated therein; and at least one controller to control activation and operation of the first activatable visual indicator and the second activatable visual indicator. The at least one controller responds to first engine data related to operating status of the first engine to selectively activate the first activatable visual indicator. The at least one controller also responds to second engine data related to operating status of the second engine to selectively activate the second activatable visual indicator.

17 Claims, 5 Drawing Sheets

(56) References Cited

U.S. PATENT DOCUMENTS

| | | | |
|---|---|---|---|
| 8,188,876 B1 * | 5/2012 | Holley | H01M 10/488 |
| | | | 340/636.15 |
| 8,223,039 B2 | 7/2012 | Pierre et al. | |
| 8,235,330 B2 | 8/2012 | Rozovski | |
| 8,337,206 B2 | 12/2012 | Taffet | |
| 8,862,290 B1 | 10/2014 | Ali | |
| 9,569,323 B1 | 2/2017 | Gershzohn | |
| 9,771,142 B2 | 9/2017 | O'Dell et al. | |
| 10,676,209 B1 | 6/2020 | Pezalla | |
| 10,889,368 B2 * | 1/2021 | Le Borloch | B64D 31/04 |
| 2018/0155008 A1 * | 6/2018 | Le Borloch | B64D 45/00 |
| 2020/0002018 A1 * | 1/2020 | Alaimo, Jr. | B64D 31/14 |
| 2020/0182183 A1 * | 6/2020 | Hunter | B64D 31/04 |
| 2021/0173425 A1 * | 6/2021 | Hunter | G05G 1/04 |
| 2022/0017208 A1 * | 1/2022 | Spiegel | B64C 13/503 |
| 2022/0017218 A1 * | 1/2022 | Spiegel | B64D 31/04 |
| 2023/0159160 A1 * | 5/2023 | Spiegel | B64C 27/56 |
| | | | 244/221 |

FOREIGN PATENT DOCUMENTS

| | | |
|---|---|---|
| EP | 2109558 B1 | 2/2015 |
| WO | 9120022 A1 | 12/1991 |

* cited by examiner

AIRCRAFT THROTTLE QUADRANT ASSEMBLY WITH INTEGRATED VISUAL INDICATOR FEATURE

TECHNICAL FIELD

Embodiments of the subject matter described herein relate generally to vehicle control systems and their related sensors and instrumentation. More particularly, embodiments of the subject matter relate to an aircraft throttle quadrant system that includes visual indicator elements integrated with the throttle control handles.

BACKGROUND

Aircraft (and other types of vehicles) usually include a throttle quadrant assembly or system that includes throttle control handles to control the operation of the engines. Aircraft throttle handles have traditionally been part of a mechanism to control various engine functions from the flight deck via cables or other mechanical components between the engine and throttle mechanism. With the advent of electronic engine controls on nearly all modern jet aircraft, mechanical controls between the engine and the throttle quadrant assembly have been eliminated and replaced with electronic control and communication via a digital bus. However, the throttle quadrant assembly in the flight deck has changed very little. For example, many aircraft still utilize throttle quadrant assemblies with separate handles for reverse thrust as if they were still connected via mechanical cables. These additional levers add weight and size to the throttle quadrant system.

Other switches and controls typically located on the throttle quadrant assembly are still retained and operated much like their older counterparts even with vast improvements in aircraft system self-monitoring and increased automation of aircraft systems. For example, most jet transport aircraft are equipped with an auto-throttle feature that controls the engine thrust automatically to maintain a commanded airspeed or other condition set by the flight crew. Despite messages and other external indications, it is not always obvious to the crew whether the auto-throttle feature is engaged or disengaged.

Accordingly, it is desirable to have an improved throttle quadrant assembly or system that provides enhanced functionality, improved user convenience, and/or intuitive messaging or indicating functionality to achieve disambiguation of system behavior. Furthermore, other desirable features and characteristics will become apparent from the subsequent detailed description and the appended claims, taken in conjunction with the accompanying drawings and the foregoing technical field and background.

BRIEF SUMMARY

Disclosed herein is a throttle quadrant system for an aircraft having a first engine and a second engine. An embodiment of the throttle quadrant system includes: a first throttle handle to control the first engine of the aircraft, the first throttle handle having a first activatable visual indicator integrated therein; a second throttle handle to control the second engine of the aircraft, the second throttle handle having a second activatable visual indicator integrated therein; and at least one controller to control activation and operation of the first activatable visual indicator and the second activatable visual indicator. The at least one controller responds to first engine data related to operating status of the first engine to selectively activate the first activatable visual indicator. The at least one controller responds to second engine data related to operating status of the second engine to selectively activate the second activatable visual indicator.

Also disclosed is a throttle quadrant system for an aircraft. An embodiment of the throttle quadrant system includes: a throttle handle to control an engine of the aircraft, the throttle handle having an activatable visual indicator integrated therein; and at least one controller to control activation and operation of the activatable visual indicator. The at least one controller responds to engine data related to status of the engine to selectively activate the activatable visual indicator. The at least one controller controls operation of the activatable visual indicator such that visual appearance of the activatable visual indicator is influenced by an operating status, state, condition, or health measurement of the engine.

Also disclosed is an aircraft having: a left engine; a right engine; a left throttle handle to control the left engine, the left throttle handle having a first activatable visual indicator integrated therein; a right throttle handle to control the right engine, the right throttle handle having a second activatable visual indicator integrated therein; and at least one controller to control activation and operation of the first activatable visual indicator and the second activatable visual indicator. The at least one controller responds to left engine data associated with the left engine to selectively activate the first activatable visual indicator, and to control operation of the first activatable visual indicator such that visual appearance of the first activatable visual indicator is influenced by an operating status, state, condition, or health measurement of the left engine. The at least one controller responds to right engine data associated with the right engine to selectively activate the second activatable visual indicator, and to control operation of the second activatable visual indicator such that visual appearance of the second activatable visual indicator is influenced by an operating status, state, condition, or health measurement of the right engine.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques related to aircraft control and monitoring systems, warning and alerting systems, onboard data communication, the processing of engine data and other sensor data onboard an aircraft, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

A vehicle-based system and related operating methodologies are disclosed herein. In accordance with certain non-limiting embodiments, the system is deployed onboard an aircraft such as an airplane. However, it should be appreciated that embodiments of the disclosed system can be utilized for other vehicle applications including, without limitation: trains; helicopters; automobiles; watercraft; monorails; amusement park rides; transportation systems; or the like.

Described herein are exemplary embodiments of a throttle quadrant assembly and system having improved functionality. The throttle quadrant system described herein incorporates a number of enhanced features and other improvements, relative to conventional systems.

In accordance with certain embodiments, dedicated reverse thrust levers and associated mechanisms and sensors are eliminated to reduce size and weight. Forward and reverse thrust are commanded by the main throttle handles (e.g., for left and right engines), while utilizing the same mechanism and sensors. From a run/idle position, the throttle handles can be moved forward to command increased forward thrust. Reverse thrust can be engaged by pulling the throttle handles aft through a gate or other stop feature at the idle position. Pulling the handles further aft commands increasing reverse thrust.

In accordance with certain embodiments, dedicated fuel cutoff toggle switches are eliminated. To achieve this configuration, fuel flow is automatically commanded "ON" whenever the throttle handle is moved from a parked/neutral position to a run/idle position. Conversely, fuel flow is automatically commanded "OFF" when the throttle handle is moved back to the parked/neutral position.

In accordance with certain embodiments, the throttle quadrant assembly incorporates a multi-function switch, knob, or other similar control element, which is used to provide a single point of operation for the crew. The multi-function element is configured and operated to be simple to use in a manner that doesn't require the crew to remember a sequence of actions. For example, if an engine fire indication is provided to the crew, a pushbutton (or other interface) associated with that engine illuminates in order to prompt the crew to take action. Pressing the button once isolates the engine bleed air, and shuts off fuel, power, and hydraulics. Pressing the button a second time discharges the appropriate fire extinguisher bottle into the respective engine. Subsequent presses of the button discharge the remaining fire extinguishers. Alternately, a multi-position rotary switch/knob could be used, with the knob being rotated through the same sequence.

In accordance with certain embodiments, each throttle handle incorporates an indication light, display, or visual indicator at the grip to aid crew awareness of auto-throttle mode changes, engine status, warning/fire indications, and the like. For example, a ring or strip of light-emitting diodes (LEDs) could be incorporated into each throttle handle and be capable of illuminating multiple colors as well as flashing, pulsing, fading, or creating other visual cues. Notional implementations may include pulsing or fading in/out a green color during engine startup and changing to a solid green color once the engine reaches normal ground idle after startup.

In accordance with certain embodiments, a throttle handle illuminates a certain color (e.g., blue) to indicate that the auto-throttle function is disengaged. A different color (e.g., amber) can be used to indicate high engine temperature, low engine oil, or other condition requiring action from the crew. Yet another color (e.g., red) can be used to indicate the presence of a hazardous condition, a high priority condition, or an emergency situation, such as an engine fire. Specifically, only the throttle handle corresponding to the troublesome engine (left or right) illuminates, providing a clear indication to the crew which throttle handle or engine requires crew action. In practice, organic LED (OLED) displays can be embedded into the throttle handles to provide more descriptive information rather than simple LED colors or illumination patterns.

Figure 1:
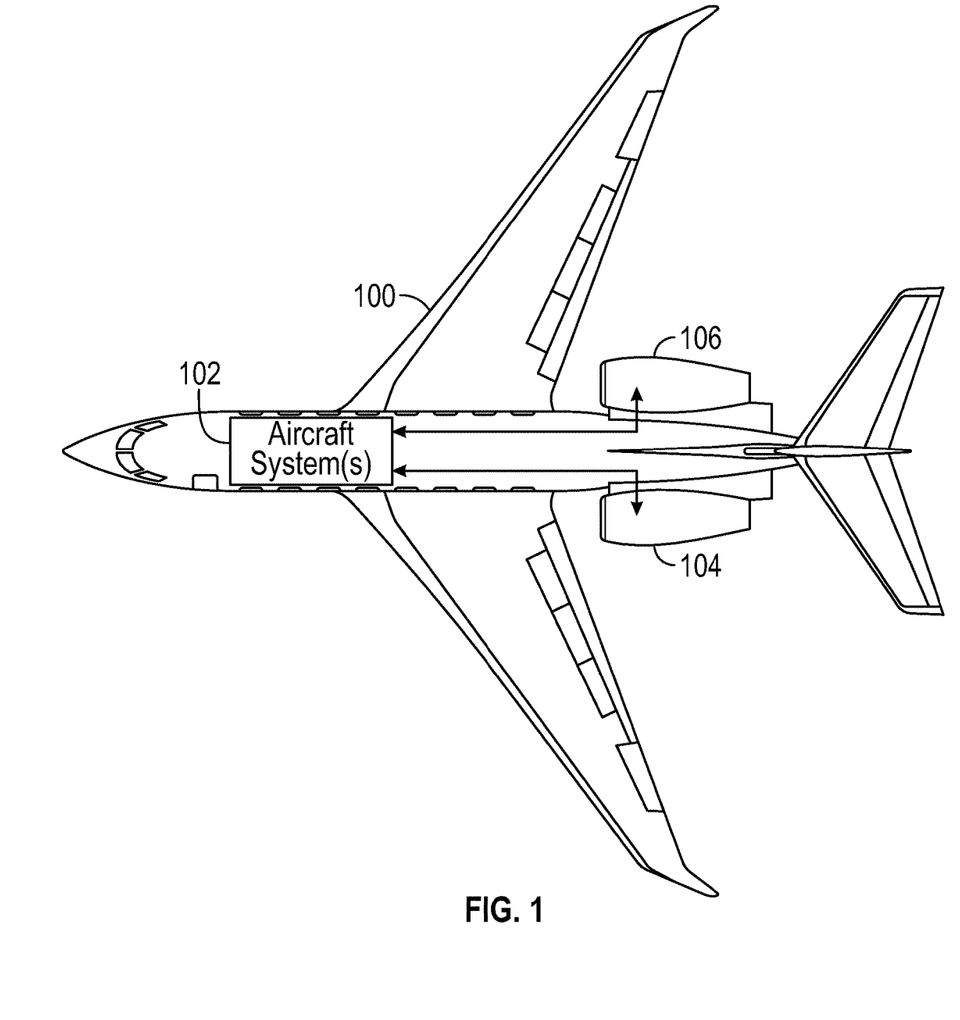
FIG. 1 is a schematic top view representation of an aircraft that is configured in accordance with exemplary embodiments of the invention.

Referring to the drawings, FIG. 1 is a schematic top view representation of an exemplary embodiment of an aircraft 100 having one or more onboard aircraft systems 102, which may include, without limitation, any of the following in combination and in any number of iterations or multiples: a flight control system; a throttle quadrant system; a navigation system; an instrumentation system; a display system; an alerting system; a warning indication system; a messaging or notification system for the flight crew; a global positioning system (GPS); and various sensors, monitors, or other sources of data associated with the operation, status, and/or condition of the aircraft 100. FIG. 1 represents the various onboard aircraft systems 102 as a single block, but it should be understood that an embodiment of the aircraft 100 will implement the onboard aircraft systems 102 with a variety of different physical, logical, and computer-implemented components.

In certain embodiments, the onboard aircraft systems 102 include at least one throttle quadrant system (not separately depicted in FIG. 1) of the type described in more detail below. The throttle quadrant system is arranged, configured, and operated to control a first (left) engine 104 and a second (right) engine 106 of the aircraft 100. Although two engines 104, 106 are shown in FIG. 1, the aircraft 100 may include more or less than two. The onboard aircraft systems 102, including the throttle quadrant system, may obtain engine data associated with the operating status, health, and/or condition of the engines 104, 106. Some of the engine data may originate from the engines 104, 106 or from certain components of the engines 104, 106. Some of the engine data may originate from sensors, monitoring devices, diagnostic systems, or other equipment onboard the aircraft 100 that communicate or cooperate with the engines 104, 106. Accordingly, FIG. 1 shows two data communication paths leading from the engines 104, 106 to the aircraft systems 102. These data communication paths schematically indicate that the aircraft systems 102 can obtain and respond to engine data associated with the first engine 104 and/or engine data associated with the second engine 106.

Figure 2:
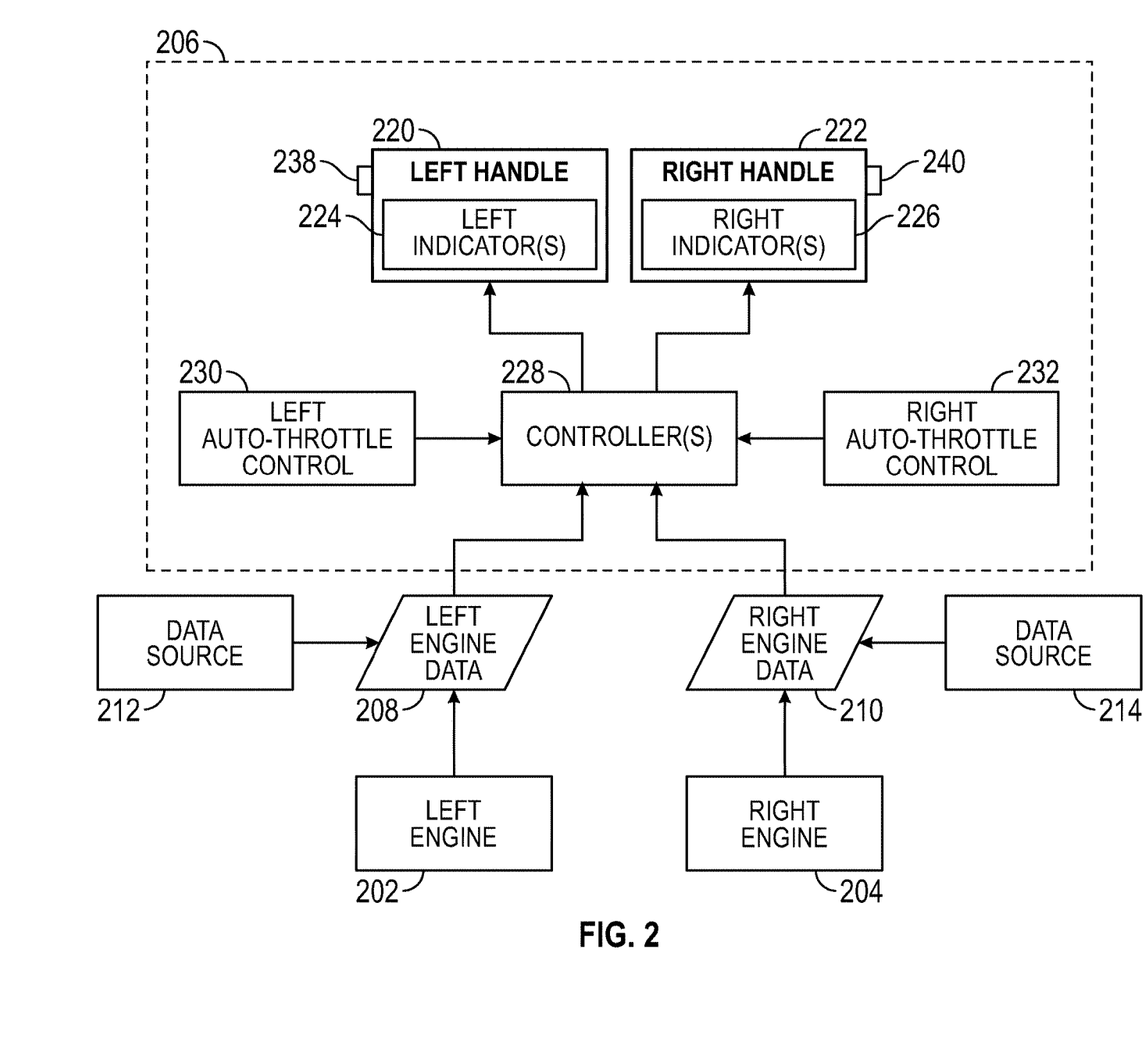
FIG. 2 is a block diagram that depicts various features and components onboard an aircraft that is configured in accordance with exemplary embodiments of the invention.

FIG. 2 is a block diagram that depicts various features and components onboard an aircraft that is configured in accordance with exemplary embodiments of the invention. Indeed, the onboard aircraft systems 102 shown in FIG. 1 may include some of the systems and components depicted in FIG. 2. To this end, FIG. 2 depicts a left engine 202, a right engine 204, and a throttle quadrant system 206 configured, arranged, and operated to control the left engine 202 and the right engine 204. As explained above, the throttle quadrant system 206 obtains or accesses left engine data 208 and right engine data 210 related to the operating status, health, and/or condition of the respective engines 202, 204. The left engine data 208 may originate from the left engine 202 and/or from at least one data source 212 (other than the left engine 202), such as an onboard sensor, measurement instrument, diagnostic system, health monitor, or the like. Similarly, the right engine data 210 may originate from the right engine 204 and/or from at least one data source 214 (other than the right engine 204), such as an onboard sensor, measurement instrument, diagnostic system, health monitor, or the like. In certain embodiments, a data source 212 and a data source 214 can be realized as a shared or common component that provides corresponding engine data associated with both engines 202, 204. The aircraft 100 includes or cooperates with at least one data communication network (not separately depicted in FIG. 2) that facilitates communication between the various components, systems, and logic onboard the aircraft 100. For example, an onboard data communication network can be utilized to communicate the engine data 208, 210, sensor data, measurements, image data, audio data, video data, alerts, messages, flight control commands, and the like.

The illustrated embodiment of the throttle quadrant system 206 includes the following components and features, without limitation: a first (left) throttle handle 220; a second (right) throttle handle 222; at least one first (left) activatable visual indicator 224; at least one second (right) activatable visual indicator 226; at least one controller 228; a first (left) auto-throttle control element 230; and a second (right) auto-throttle control element 232. In certain embodiments, the left throttle handle 220 includes a first (left) user interface control element 238 incorporated or integrated therein, and the right throttle handle 222 includes a second (right) user interface control element 240 incorporated or integrated therein. A deployed implementation of the aircraft 100 may include some or all of the illustrated items, additional items (as needed or desired), and/or alternative items (as needed or desired). FIG. 2 is merely an illustrative example that depicts certain items that support the inventive subject matter described herein.

The left throttle handle 220 is configured and arranged to be manipulated to control the left engine 202 of the aircraft, and the right throttle handle 222 is configured and arranged to be manipulated to control the right engine 204 of the aircraft. In certain embodiments, the left throttle handle 220 includes at least one activatable visual indicator 224 integrated therein, incorporated therein, or coupled thereto. Likewise, in certain embodiments, the right throttle handle 222 includes at least one activatable visual indicator 226 integrated therein, incorporated therein, or coupled thereto. The visual indicators 224, 226 can be implemented using any available technology, form factor, or components. In this regard, the visual indicators 224, 226 may include, incorporate, or be realized as any of the following, without limitation: one or more LEDs arranged in any desired pattern or layout (e.g., a strip, a ring, or a grid); an OLED display; backlit letters, text, or labels; and/or a display element.

The at least one controller 228 may include any combination of software and hardware. For example, a controller 228 may include an application specific integrated circuit (ASIC), a field programmable gate array (FPGA), an electronic circuit, a processor (shared, dedicated, or group) and memory that execute one or more software or firmware programs, a combinational logic circuit, and/or other suitable components that provide the described functionality. In certain embodiments, the at least one controller 228 is configured, programmed, and operated to control the selective activation and operation of the activatable visual indicators 224, 226 as needed. More specifically, the at least one controller 228 responds to the left engine data 208 as needed to selectively activate and control the left activatable visual indicator(s) 224, and responds to the right engine data 210 as needed to selectively activate and control the right activatable visual indicator(s) 226. The activation, control, and regulation of the visual characteristics of the activatable visual indicators 224, 226 are described in more detail below with reference to FIGS. 4 and 5.

The illustrated embodiment of the throttle quadrant system 206 includes the left and right auto-throttle control elements 230, 232 to support an auto-throttle mode of the aircraft 100. A pilot can activate (engage) or deactivate (disengage) the auto-throttle mode by actuating or otherwise manipulating the auto-throttle control elements 230, 232 as desired. In certain embodiments, the auto-throttle control elements 230, 232 include or cooperate with corresponding buttons, levers, and/or switches that control the state of the auto-throttle mode.

The illustrated embodiment of the throttle quadrant system 206 includes the left and right user interface control elements 238, 240. In certain implementations, the left throttle handle 220 includes the left user interface control element 238 integrated therein, incorporated therein, or coupled thereto. Likewise, in certain implementations, the right throttle handle 222 includes the right user interface control element 240 integrated therein, incorporated therein, or coupled thereto. The user interface control elements 238, 240 are suitably configured, arranged, and positioned such that user interaction with the control elements 238, 240 initiates some type of action onboard the aircraft 100. In practice, the control elements 238, 240 may include or be realized as any of the following, without limitation: a button, a switch, a lever, a slider, a handle, a dial, a knob, and/or a touch-sensitive component (e.g., a touchpad, a touchscreen, a pressure-sensitive membrane). In accordance with certain embodiments, the left activatable visual indicator 224 includes a touch-sensitive user interface control element 238 and/or the right activatable visual indicator 226 includes a touch-sensitive user interface control element 240.

Figure 3:
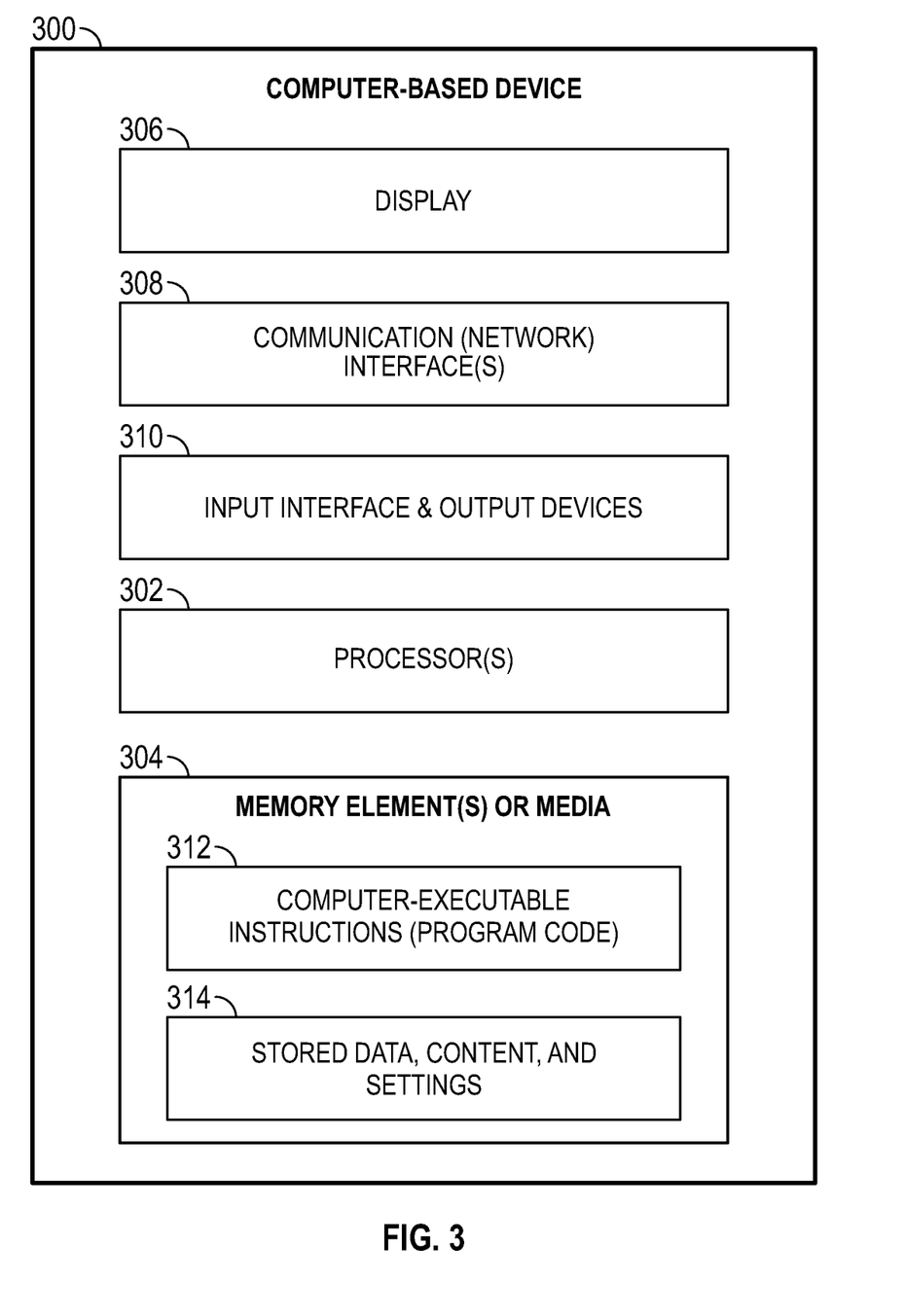
FIG. 3 is a block diagram of an exemplary embodiment of a computer-based device.

In accordance with certain embodiments, an aircraft system 102 depicted in FIG. 1, and certain items depicted in FIG. 2 can be implemented as at least one computer-based or a processor-based device, system, or piece of equipment. In this regard, FIG. 3 is a simplified block diagram representation of an exemplary embodiment of a computer-based device 300, which may be used to implement certain devices or systems onboard the aircraft 100.

The device 300 generally includes, without limitation: at least one processor 302; at least one memory storage device, storage media, or memory element 304; a display 306; at least one communication (network) interface 308; and input and output (I/O) devices 310, such as an input interface, one or more output devices, one or more human/machine interface elements, or the like. In practice, the device 300 can include additional components, elements, and functionality that may be conventional in nature or unrelated to the particular application and methodologies described here.

A processor 302 may be, for example, a central processing unit (CPU), a field programmable gate array (FPGA), a microcontroller, an application specific integrated circuit (ASIC), or any other logic device or combination thereof. One or more memory elements 304 are communicatively coupled to the at least one processor 302, and can be implemented with any combination of volatile and non-volatile memory. The memory element 304 has non-transitory machine-readable and computer-executable instructions (program code) 312 stored thereon, wherein the instructions 312 are configurable to be executed by the at least one processor 302 as needed. When executed by the at least one processor 302, the instructions 312 cause the at least one processor 302 to perform the associated tasks, processes, and operations defined by the instructions 312. Of course, the memory element 304 may also include instructions associated with a file system of the host device 300 and instructions associated with other applications or programs. Moreover, the memory element 304 can serve as a data storage unit for the host device 300. For example, the memory element 304 can provide storage 314 for aircraft data, navigation data, sensor data, measurements, image and/or video content, settings or configuration data for the aircraft 100, and the like.

The display 306 (if deployed with the particular embodiment of the device 300) may be integrated with the device 300 or communicatively coupled to the device 300 as a peripheral or accessory component. The shape, size, resolution, and technology of the display 306 will be appropriate to the particular implementation of the device 300. The display 306 can be realized as a monitor, touchscreen, or another conventional electronic display that is capable of graphically presenting data and/or information provided by the device 300.

The communication interface 308 represents the hardware, software, and processing logic that enables the device 300 to support data communication with other devices. In practice, the communication interface 308 can be suitably configured to support wireless and/or wired data communication protocols as appropriate to the particular embodiment. For example, the communication interface 308 can be designed to support an aircraft network protocol, a cellular communication protocol, a short-range wireless protocol (such as the BLUETOOTH communication protocol), and/or a WLAN protocol. As another example, if the device 300 is a desktop or laptop computer, then the communication interface can be designed to support the BLUETOOTH communication protocol, a WLAN protocol, and a LAN communication protocol (e.g., Ethernet). In accordance with certain aircraft applications, the communication interface 308 is designed and configured to support one or more onboard network protocols used for the communication of information between devices, components, and subsystems of the aircraft 100.

The I/O devices 310 enable the user of the device 300 to interact with the device 300 as needed. In practice, the I/O devices 310 may include, without limitation: an input interface to receive data for handling by the device 300; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; a lidar sensor; or any conventional peripheral device. In this context, a touchscreen display 306 can be categorized as an I/O device 310. Moreover, a touchscreen display 306 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

As mentioned above, in the embodiment depicted in FIG. 2, the left throttle handle 220 includes at least one corresponding visual indicator 224, and the right throttle handle 222 includes at least one corresponding visual indicator 226. The left visual indicator 224 is activated and controlled to indicate an operating status, state, condition, health measurement, or anything related to the left engine 202. Conversely, the right visual indicator 226 is activated and controlled to indicate an operating status, state, condition, health measurement, or anything related to the right engine 204. The presence of the visual indicators 224, 226 on the left and right throttle handles 220, 222 (respectively) makes it easy and intuitive for pilots to quickly identify and understand whether a displayed indication, light, message, or icon relates to the left engine 202, the right engine 204, or both engines 202, 204.

In accordance with some embodiments, the at least one controller 228 controls operation of the left and right activatable visual indicators 224, 226 such that visual appearance of the left activatable visual indicator 224 is influenced by an operating status, state, condition, or health measurement of the left engine 202, and such that visual appearance of the right activatable visual indicator 226 is influenced by an operating status, state, condition, or health measurement of the right engine 204. For example, the at least one controller 228 may vary certain visually distinguishable characteristics of the left activatable visual indicator 224 in accordance with the operating status, state, condition, or health measurement of the left engine 202, and vary certain visually distinguishable characteristics of the right activatable visual indicator 226 in accordance with the operating status, state, condition, or health measurement of the right engine 204. The visually distinguishable characteristics of the visual indicators 224, 226 may include any of the following (alone or in any feasible combination), without limitation: colors; brightness; line patterns; line thickness; shapes; sizes; flashing patterns; pulsing patterns; fading patterns; text content; font; background; image content; video content; and animation. A monitored, observed, or measured operating status, state, condition, or health measurement of the left and right engines 202, 204 may relate to any of the following (alone or in any feasible combination), without limitation: engine fire status; auto-throttle activation state; engine malfunction status; engine temperature; engine oil level; engine vibration status; fan blade off status; foreign object strike; and icing condition.

In accordance with some embodiments, the left activatable visual indicator 224 is configured and controlled to indicate an abnormal operating status, state, condition, or health of the left engine 202, and the right activatable visual indicator 226 is configured and controlled to indicate an abnormal operating status, state, condition, or health of the right engine 204. This example assumes that the left throttle handle 220 includes a user interface control element 238 associated therewith, and that the right throttle handle 222 includes a user interface control element 240 associated therewith. In accordance with this example, the left user interface control element 238 can be actuated to initiate at least one corrective action onboard the aircraft 100 to address an abnormal operating status, state, condition, or health of the left engine 202 (as conveyed by the left activatable visual indicator 224). Likewise, the right user interface control element 240 can be actuated to initiate at least one corrective action onboard the aircraft 100 to address an abnormal operating status, state, condition, or health of the right engine 204 (as conveyed by the right activatable visual indicator 226). For example, the user interface control elements 238, 240 could be used to activate a fire extinguisher, to initiate engine shutdown, to generate an alarm, to transmit a message or communication from the aircraft, or the like.

The visual indicators 224, 226 enhance flight crew awareness during flight, especially in situations that might require flight crew action in connection with one or more of the aircraft engines. In certain embodiments, the visual indicators 224, 226 also enhance flight crew awareness of auto-throttle status (engaged or disengaged) in an ongoing manner.

Figure 4:
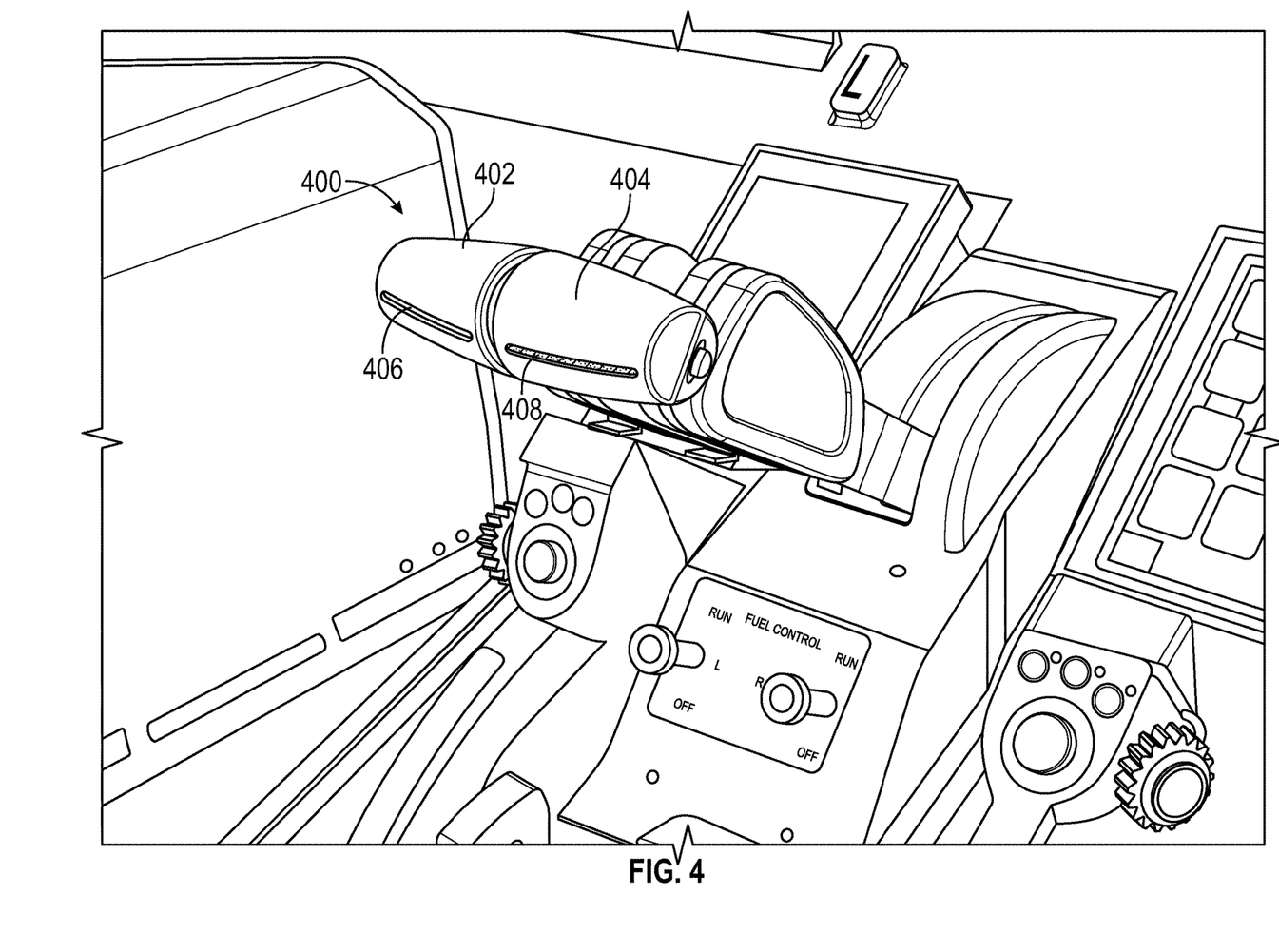
FIG. 4 is a front perspective view of a throttle quadrant assembly that is configured in accordance with exemplary embodiments of the invention.
Figure 5:
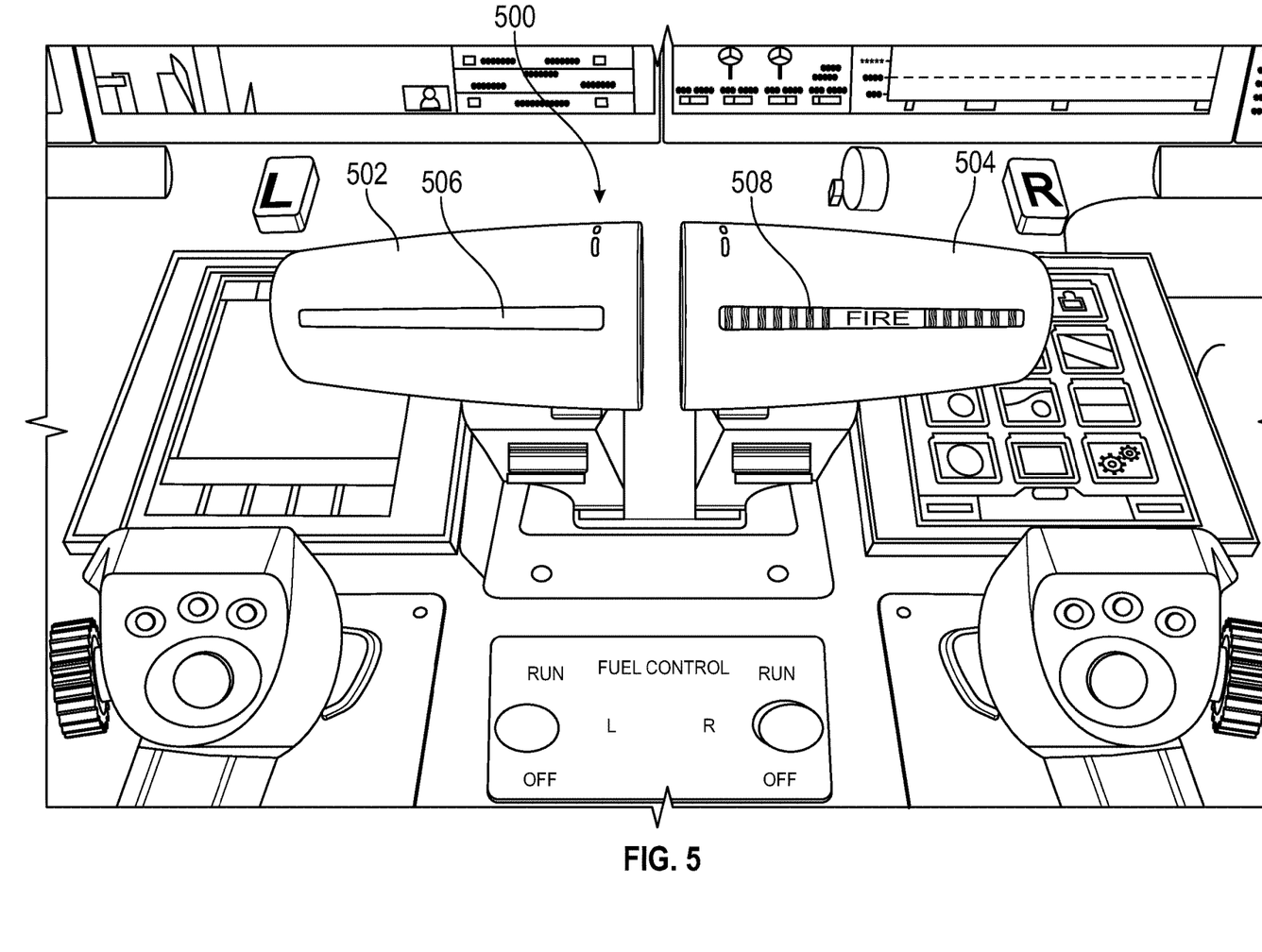
FIG. 5 is a front perspective view of another throttle quadrant assembly that is configured in accordance with exemplary embodiments of the invention.

The design, layout, configuration, and functionality of the activatable visual indicators on the throttle handles can be chosen to suit the needs of the particular aircraft and intended application. FIGS. 4 and 5 merely depict two nonlimiting examples. FIG. 4 is a front perspective view of an exemplary embodiment of a throttle quadrant assembly 400 that utilizes a relatively simple visual indication methodology, and FIG. 5 is a front perspective view of an exemplary embodiment of a throttle quadrant assembly 500 that utilizes a text-based visual indication methodology.

The throttle quadrant assembly 400 shown in FIG. 4 includes a left throttle handle 402, a right throttle handle 404, an activatable left visual indicator 406 on the left throttle handle 402, and an activatable right visual indicator 408 on the right throttle handle 404. The visual indicators 406, 408 can be controlled to be inactive (off) or active (on) as needed. In certain embodiments, the visual indicators 406, 408 can be controlled to output different colors, which can be mapped to indicate corresponding conditions, alerts, status, or any desired meaning. In certain embodiments, other visually distinguishable characteristics of the visual indicators 406, 408 can be controlled and regulated to convey different conditions, alerts, status, or any desired meaning. Such visually distinguishable characteristics may include any of the following, without limitation: colors; brightness level; illumination/activation patterns; illumination/activation flashing patterns; illumination pulsing patterns; illumination fading patterns.

The throttle quadrant assembly 500 shown in FIG. 5 includes a left throttle handle 502, a right throttle handle 504, an activatable left visual indicator 506 on the left throttle handle 502, and an activatable right visual indicator 508 on the right throttle handle 504. The visual indicators 506, 508 can be controlled to be inactive (off) or active (on) as needed. In certain embodiments, the visual indicators 506, 508 can be controlled to output different colors, which can be mapped to indicate corresponding conditions, alerts, status, or any desired meaning. In certain embodiments, other visually distinguishable characteristics of the visual indicators 506, 508 can be controlled and regulated to convey different conditions, alerts, status, or any desired meaning. Such visually distinguishable characteristics may include any of the following, without limitation: colors; brightness level; illumination/activation patterns; illumination/activation flashing patterns; illumination pulsing patterns; illumination fading patterns; displayed line patterns, line thickness, shapes, or sizes; text content; font; background image; image content; video content; animation content. FIG. 5 depicts a scenario where a right engine fire has been detected. Accordingly, the right visual indicator 508 is activated and controlled to visually convey an appropriate warning, notification, or message. In this example, the right visual indicator 508 is activated such that it illuminates in a red color and displays the text "FIRE" in a conspicuous manner. The right visual indicator 508 can also be controlled to generate a flashing or pulsing effect intended to focus the attention of the flight crew.

The visual content, visual characteristics, displayed content, and operation of the visual indicators on the throttle handles are controlled in an appropriate manner to convey the desired meaning to the flight crew. The following are several non-limiting and non-exhaustive use case examples that involve the activation and operation of the visual indicators Example 1: the visual indicators are controlled to indicate the auto-throttle status of the left and right engines. A visual indicator can be activated to indicate an auto-throttle engaged status, and deactivated to indicate an auto-throttle disengaged status. Alternatively, a visual indicator corresponding to auto-throttle status can be persistently illuminated with a color-coded scheme that indicates the current state of the auto-throttle mode (e.g., green to indicate an active state, and a different color such as blue to indicate an inactive state; alternatively, no indication (e.g., a dark, black, or otherwise non-illuminated condition) can be used to represent the inactive state of the auto-throttle). Yet another alternate example would be to temporarily provide a flashing or steady indication when the auto-throttle transitions from engaged to disengaged. The indication may automatically extinguish after a fixed period of time, or the indication can be suppressed once the crew acknowledges the indication.

Example 2: one or more visually distinguishable characteristics of the visual indicators can be changed to indicate the current engine status and/or to convey a warning or an alert (e.g., engine fire, engine overheating, low engine oil, bird strike, excessive vibration). Flashing red indicators could be used to provide a fire detection warning, while a steady red indication would indicate an engine overheat condition. Flashing amber indications could be used to indicate an excessive vibration was detected while a steady amber could indicate degraded thrust. Flashing indicators could mean immediate crew action required while steady indicators could mean an urgent condition for the crew to address. Steady blue indications would be advisory and used to alert the crew to other detected or commanded conditions which may not require crew action such as low engine oil or if the engine automatically switches to continuous ignition.

Example 3: text-based visual indicators can be controlled to generate contextually appropriate text content that indicates something associated with the operating status, condition, health status, or control of the aircraft engines.

Example 4: multiple indicator elements (e.g., a plurality of LEDs) can be controlled in a selective manner to provide a rough approximation of a measurable quantity. For example, five illuminated LEDs indicates full thrust, four illuminated LEDs indicates 75% thrust, three illuminated LEDs indicates 50% thrust, two illuminated LEDs indicates 25% thrust, and one illuminated LED indicates idle thrust. A similar illumination scheme can be applied to other quantities such as Engine Pressure Ratio (EPR) or engine shaft speed.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A throttle quadrant system for an aircraft having a first engine and a second engine, the throttle quadrant system comprising:
    a first throttle handle to control the first engine of the aircraft, the first throttle handle comprising a first activatable visual indicator integrated therein;
    a second throttle handle to control the second engine of the aircraft, the second throttle handle comprising a second activatable visual indicator integrated therein; and
    at least one controller to control activation and operation of the first activatable visual indicator and the second activatable visual indicator; wherein:
    the at least one controller responds to first engine data related to operating status of the first engine to selectively activate the first activatable visual indicator;
    the at least one controller responds to second engine data related to operating status of the second engine to selectively activate the second activatable visual indicator;
    the first activatable visual indicator is configured and controlled to indicate an abnormal operating status, state, condition, or health of the first engine;
    the second activatable visual indicator is configured and controlled to indicate an abnormal operating status, state, condition, or health of the second engine;
    the first throttle handle comprises a first user interface control element integrated therein;
    the second throttle handle comprises a second user interface control element integrated therein;
    actuation of the first user interface control element initiates a first corrective action onboard the aircraft to address the abnormal operating status, state, condition, or health of the first engine; and
    actuation of the second user interface control element initiates a second corrective action onboard the aircraft to address the abnormal operating status, state, condition, or health of the second engine.

2. The throttle quadrant system of claim 1, wherein:
    the first throttle handle is a left throttle handle;
    the first engine is a left engine of the aircraft;
    the second throttle handle is a right throttle handle; and
    the second engine is a right engine of the aircraft.

3. The throttle quadrant system of claim 1, wherein the at least one controller controls operation of the first and second activatable visual indicators such that visual appearance of the first activatable visual indicator is influenced by an operating status, state, condition, or health measurement of the first engine, and such that visual appearance of the second activatable visual indicator is influenced by an operating status, state, condition, or health measurement of the second engine.

4. The throttle quadrant system of claim 3, wherein:
    the at least one controller varies visually distinguishable characteristics of the first activatable visual indicator in accordance with the operating status, state, condition, or health measurement of the first engine; and
    the at least one controller varies visually distinguishable characteristics of the second activatable visual indicator in accordance with the operating status, state, condition, or health measurement of the second engine.

5. The throttle quadrant system of claim 4, wherein the visually distinguishable characteristics of the first and second activatable visual indicators are selected from the group consisting of: colors; brightness; line patterns; line thickness; shapes; sizes; flashing patterns; pulsing patterns; fading patterns; text content; font; background; image content; video content; and animation.

6. The throttle quadrant system of claim 3, wherein the operating status, state, condition, or health measurement of the first and second engines relates to one or more of: engine fire status; auto-throttle activation state; engine malfunction status; engine temperature; engine oil level; engine vibration status; fan blade off status; foreign object strike; and icing condition.

7. The throttle quadrant system of claim 1, wherein the first activatable visual indicator and/or the second activatable visual indicator comprises a touch-sensitive user interface control element.

8. A throttle quadrant system for an aircraft, the throttle quadrant system comprising:
a throttle handle to control an engine of the aircraft, the throttle handle comprising an activatable visual indicator integrated therein; and
at least one controller to control activation and operation of the activatable visual indicator;
wherein the at least one controller responds to engine data related to status of the engine to selectively activate the activatable visual indicator;
wherein the at least one controller controls operation of the activatable visual indicator such that visual appearance of the activatable visual indicator is influenced by an operating status, state, condition, or health measurement of the engine;
wherein the activatable visual indicator is configured and controlled to indicate an abnormal operating status, state, condition, or health of the engine;
wherein the throttle handle comprises a user interface control element integrated therein; and
wherein actuation of the user interface control element initiates a corrective action onboard the aircraft to address the abnormal operating status, state, condition, or health of the engine.

9. The throttle quadrant system of claim 8, wherein:
the at least one controller varies visually distinguishable characteristics of the activatable visual indicator in accordance with the operating status, state, condition, or health measurement of the engine.

10. The throttle quadrant system of claim 9, wherein the visually distinguishable characteristics of the activatable visual indicator are selected from the group consisting of: colors; brightness; line patterns; line thickness; shapes; sizes; flashing patterns; pulsing patterns; fading patterns; text content; font; background; image content; video content; and animation.

11. The throttle quadrant system of claim 8, wherein the operating status, state, condition, or health measurement of the engine relates to one or more of: engine fire status; auto-throttle activation state; engine malfunction status; engine temperature; engine oil level; engine vibration status; fan blade off status; foreign object strike; and icing condition.

12. The throttle quadrant system of claim 8, wherein the activatable visual indicator comprises a touch-sensitive user interface control element.

13. An aircraft comprising:
a left engine;
a right engine;
a left throttle handle to control the left engine, the left throttle handle comprising a first activatable visual indicator integrated therein;
a right throttle handle to control the right engine, the right throttle handle comprising a second activatable visual indicator integrated therein; and
at least one controller to control activation and operation of the first activatable visual indicator and the second activatable visual indicator; wherein:
the at least one controller responds to left engine data associated with the left engine to selectively activate the first activatable visual indicator, and to control operation of the first activatable visual indicator such that visual appearance of the first activatable visual indicator is influenced by an operating status, state, condition, or health measurement of the left engine;
the at least one controller responds to right engine data associated with the right engine to selectively activate the second activatable visual indicator, and to control operation of the second activatable visual indicator such that visual appearance of the second activatable visual indicator is influenced by an operating status, state, condition, or health measurement of the right engine;
the first activatable visual indicator is configured and controlled to indicate an abnormal operating status, state, condition, or health of the left engine;
the second activatable visual indicator is configured and controlled to indicate an abnormal operating status, state, condition, or health of the right engine;
the left throttle handle comprises a first user interface control element integrated therein;
the right throttle handle comprises a second user interface control element integrated therein;
actuation of the first user interface control element initiates a first corrective action onboard the aircraft to address the abnormal operating status, state, condition, or health of the left engine; and
actuation of the second user interface control element initiates a second corrective action onboard the aircraft to address the abnormal operating status, state, condition, or health of the right engine.

14. The aircraft of claim 13, wherein:
the at least one controller varies visually distinguishable characteristics of the first activatable visual indicator in accordance with the operating status, state, condition, or health measurement of the left engine; and
the at least one controller varies visually distinguishable characteristics of the second activatable visual indicator in accordance with the operating status, state, condition, or health measurement of the right engine.

15. The aircraft of claim 14, wherein the visually distinguishable characteristics of the first and second activatable visual indicators are selected from the group consisting of: colors; brightness; line patterns; line thickness; shapes; sizes; flashing patterns; pulsing patterns; fading patterns; text content; font; background; image content; video content; and animation.

16. The aircraft of claim 13, wherein the operating status, state, condition, or health measurement of the left and right engines relates to one or more of: engine fire status; auto-throttle activation state; engine malfunction status; engine temperature; engine oil level; engine vibration status; fan blade off status; foreign object strike; and icing condition.

17. The aircraft of claim 13, wherein the first activatable visual indicator and/or the second activatable visual indicator comprises a touch-sensitive user interface control element.

* * * * *